United States Patent

Bews

[11] Patent Number: 4,603,653
[45] Date of Patent: Aug. 5, 1986

[54] MARINE ANTIFOULING MATERIALS AND MARKERS

[75] Inventor: Andrew M. Bews, Edinburgh, Scotland

[73] Assignee: United Wire Group, Edinburgh, Scotland

[21] Appl. No.: 770,792

[22] Filed: Aug. 29, 1985

Related U.S. Application Data

[63] Continuation-in-part of Ser. No. 532,045, Sep. 14, 1983, abandoned.

[30] Foreign Application Priority Data

Sep. 14, 1982 [GB] United Kingdom ............... 8226183

[51] Int. Cl.⁴ .................................................. B63B 59/04
[52] U.S. Cl. .................................. 116/209; 114/67 R; 114/222; 428/907
[58] Field of Search .................. 116/209; 40/326; 106/15.05; 114/67 R, 222, 329, 355, 361; 405/211, 216; 428/907

[56] References Cited

U.S. PATENT DOCUMENTS

| 629,427 | 7/1899 | Coleman | 428/907 |
| 682,913 | 9/1901 | Coleman | 428/907 |
| 3,219,505 | 11/1965 | Hilding | 428/907 |
| 3,476,577 | 11/1969 | Davie | 428/907 |
| 3,554,154 | 1/1971 | Thomas | 114/222 |
| 4,323,599 | 4/1982 | Marshall | 428/907 |
| 4,375,199 | 3/1983 | Graem-Barber | 114/222 |

FOREIGN PATENT DOCUMENTS 2084488 4/1982 United Kingdom .

Primary Examiner—Charles Frankfort
Assistant Examiner—Thomas B. Will
Attorney, Agent, or Firm—Watson, Cole, Grindle & Watson

[57] ABSTRACT

A marine antifouling material providing an antifouling surface for use in sea water comprises a layer of inert, water-insoluble, flexible and extensible elastomeric carrier material having embedded therein a single layer only of a plurality of copper or copper alloy particles of substantially uniform size and shape exposed at the outer surface of the material to provide a multiplicity of generally evenly sized discrete copper areas in the inert material continuum surface thereof. The particles are insulated from each other and from an opposed inner surface of the material.

22 Claims, 7 Drawing Figures

MARINE ANTIFOULING MATERIALS AND MARKERS

RELATED APPLICATION

This application is a continuation-in-part of U.S. Ser. No. 532,045, filed Sept. 14, 1983 now abandoned.

BACKGROUND OF THE INVENTION

This invention relates generally to materials useful for protecting submerged or submersible structures against marine fouling and to marine identification markers made therefrom.

The classic approach to the prevention or retardation of the growth of marine organisms on submerged or submersible surfaces has been to clad the surfaces with sheet copper or copper alloy. A number of problems and disadvantages arise. Firstly, sheet copper or copper alloy is expensive. Secondly, it can be very difficult to clad an existing structure with copper sheet, because the copper must be kept out of contact with other metallic materials such as steel to avoid galvanic action which not only promotes corrosion but also renders the copper ineffective as an antifouling material. Certainly, it can be difficult physically to attach the copper firmly enough to the surface, e.g. the hull of a ship, for it to remain securely in place over a period of years. There are also other problems, and as a result although sheet copper is an excellent antifouling material, it is not in practice used very widely as a cladding.

With a view to avoiding some of the difficulties associated with sheet copper cladding, antifouling paints have been developed which contain copper oxide. One of the main drawbacks with such paints, however, is that they have a relatively short life, e.g. six months to two years at most.

Another antifouling coating approach is disclosed in U.S. Pat. No. 4,323,599 using copper flakes mixed with an uncured water-insoluble polymer and applying the mixture to the surface to be protected, whereafter the coating is cured. A sufficient amount of copper flake is utilized so the entire thickness of the coating (gel coat) is electrically conductive.

In these known approaches, it has been considered essential to cover the whole of the surface to be protected against fouling, with either the sheet copper (or alloy) or with the copper-containing paint or gel. However, in U.S. Pat. No. 4,375,199, commonly owned herewith, another approach to the problem is described. In particular, described therein is a manner in which antifouling can be achieved by providing a surface which is a continuum of inert material, such as a plastic material, with a multiplicity of tiny, regularly arranged, areas of exposed copper (or copper alloy) therein. Such a surface can be provided by embedding, in a carrier material, a woven or knitted wire mesh, or an expanded metal grid. In the case of the wire mesh, i.e. wire cloth, the knuckles on one side of the wire cloth are exposed at the surface, forming a regular array of tiny copper areas in the surface continuum of carrier material. The opposite face of the wire cloth is embedded in the carrier material and not exposed. This antifouling composite material can be formed in situ on a structure, e.g. the hull of a ship, or can be pre-fabricated in panels for subsequent application to a submerged or submersible structure. The panels can be made in virtually any shape suitable for their intended use. Reference should be made to the aforementioned U.S. Pat. No. 4,375,199 for further details.

It has now been found that antifouling surfaces comprising a continuum of inert carrier material with interspersed small areas of exposed copper or copper alloy can with advantage, be made in a form and in ways other than those described in U.S. Pat. No. 4,375,199, provided certain criteria are met, and can be used in the special application of long life antifouling marker devices.

Although the antifouling structure according to U.S. Pat. No. 4,375,199 can have its mesh embedded in a flexible plastics material, even when such a material is used the final structure is relatively inflexible. This is, of course, due to the inherent inflexibility of the woven copper mesh itself.

For purposes of cladding sub-sea pipes with an antifouling coating, the coating material must either be preformed of an exact shaped fit to the curvature of the pipe or it must be flexible so that it can be shaped onto the pipe surface. However, it is not sufficient merely to be able to bend the material around the pipe because at least at junctions with other pipes and on bends, the antifouling material must also be capable of flexing longitudinally, i.e. stretching. Thus, although the structure of the aforementioned commonly owned patent having its woven copper mesh embedded in a plastic carrier material could flex about a single radius of curvature, it could not stretch.

Another problem in the antifouling field is that in recent years, particularly in connection with off-shore oil and gas rigs and platforms, and associated equipment such as sub-sea pipelines, a need has arisen to be able to identify components, particularly at depth. There are several problems, peculiar to marine environment, which make the provision of satisfactory identification markers difficult. These include the corrosive effects of sea water, the problem of providing a marker which is clearly visible under the limited illumination available, and of course the problem of fouling the marker by marine vegetable and animal organisms.

SUMMARY OF THE INVENTION

It is therefore an object of the present invention to provide a marine antifouling material having flexibility and extensibility, and having interspersed small areas of copper or copper alloy.

In accordance with the invention, the material is formed as a layer of inert, water insoluble, flexible insulating material, such as rubber, which serves as carrier having embedded therein particles of copper or copper alloy at one surface only. The particles of copper are in the form of a mono-particle layer, i.e. the layer has a maximum thickness equal to the size of the particles.

The flexible insulating material extends below the monolayer so that there is no practical possibility of the copper particles being exposed to anything other than one surface, i.e. the top surface of the layer. Each particle is insulated from each other particle so that individual particles do not contact any other individual particles. All the particles are of uniform shape and uniform size.

In one method of making the material of the invention, copper or copper alloy pieces are produced by chopping wire, e.g. of circular or square-section, such that the particles formed have a length substantially equal to their diameter or maximum cross- sectional dimension. Thus, solid lumps of copper are produced rather than flakes or elongate filaments or the like.

The copper particles are regularly distributed over the surface of the carrier material to provide the characteristics necessary to achieve antifouling. That is to say, the surface spacing between adjacent copper particles must be such that the furthest distance from the nearest exposed copper is no greater than about 0.75 mm, and preferably not less than about 0.5 mm. The particles of copper or copper alloy produced are loaded onto the surface of a sticky sheet and are spread to form a single layer having the intended particle spacing. The particle spacing in the range of 0.5 to 0.75 mm will be achieved depending on the quantity of particles loaded onto the surface whereupon the intended spacing will be automatically effected as a monolayer. A layer of rubber carrier material is then laid over the particles and subsequently cured. The sticky sheet is then removed. The cupro-nickel employed as a copper alloy bonds to the rubber. This is a known property of cupro-nickel.

The minimum size of the copper or copper alloy particles is at least 0.5 mm and may normally be up to about 1.5 mm.

Because the copper particles are in a surface layer, there is an insulating layer below them which is laid in contact or joined with the surface to be protected. This insulation ensures that the copper particles do not contact the steel substrate (for example), since if they did so they would promote corrosion. However, should any copper particle or particles happen to contact the steel substrate, this would not "short-out" all the copper for antifouling purposes since each copper particle is insulated from adjacent particles. Were it not for this insulation between adjacent particles, then the whole of the exposed copper would be rendered useless for antifouling purposes if one part of the copper was to come in contact with a baser metal.

The product of the invention is in the form of a sheet of material, the minimum thickness of the sheet being greater than the maximum depth of any copper particle, so as to provide the electrical insulation below the surface layer.

The sheet has extensibility as well as flexibility so that it can be applied to a dual radius surface or one having a compound curvature. The approximate minimum exposure of copper at the surface of the sheet is about 20% to provide the desired antifouling. Exposures of greater than 40% are not usually used in practice as they are wasteful of copper.

The uniform size of the copper or copper alloy particles is important in respect of the useful life of the product. By having particles of uniform size, they will all become depleted at approximately the same time whereas, if particles were to be used which were not of uniform size, then some would be leached away well before the others, thus forming a surface with inadequate copper for antifouling purposes.

As to the shape of the particles, the ratios of their major dimensions are all in the range of about 0.7 to 1.0. Thus, for example, if the particles are laid on a flat horizontal surface, they are all of approximately the same dimensions in plan and elevation and, for each particle, its two major dimensions in plan (i.e. a first dimension being the length of the particle in plan and a second dimension being the width in plan measured at right angles to the first dimension) and its elevation will all be in a ratio of about 0.7 to 1.0 with respect to each other. The particles are thus solid lumps and not flakes or elongate filaments. Each of the particles may be of polyhedral shape, or more specifically in the form of a cube. Or, each of the particles may comprise a body having a rounded surface such as a cylinder or other shapes meeting this definition. Otherwise, the particles of a given monolayer may comprise a mix of polyhedral bodies and bodies having rounded surfaces.

The exposed copper or copper alloy surface of the antifouling material of the invention requires no or minimal abrasion either at the termination of product formulation or at any intermediate stage. And, the present product has a built in insulation layer so that it can be placed onto steel or any other corrosive prone metal.

Thus, one of the important advantages achieved by the invention, particularly compared to the conventional use of anitfouling paints is the longer life of the antifouling surface. This is achieved by using particles of copper which, in themselves, provide a reservoir of copper which will only be depleted over a considerable period. The very finely powdered copper known to be used in antifouling paints leaches away or is lost over short periods, but the larger copper particles used in the present invention have a much longer useful antifouling life. In fact, in the present invention, the antifouling life of a surface can in a general sense be controlled by using copper pieces of a predetermined size, the larger the particles the longer generally is the life. The minimum size of a copper particle is preferably 0.5 mm (e.g. this is the wire diameter when the particles are derived from wire), and the maximum size of a copper particle is about 3.0 mm.

The marine antifouling materials which are the subject of U.S. Pat. No. 4,375,199, and that described above in accordance with the present invention, rely for their antifouling properties upon the known toxicity of copper to marine organisms. It has been found, however, that certain species of marine life have, or can develop, a tolerance to copper. Some known antifouling paints thus include one or more further toxins to combat the copper-tolerant organisms. According to a further aspect of the present invention, one or more such further toxins may be included in the antifouling materials of the present invention. For example, the further toxin may be provided in the elastomeric carrier material. Or preferably, however, the further toxin or toxins are provided as a coating on the copper or copper alloy particles. The coating can be in the form of a solution or dispersion of the toxin in a suitable carrier, and relatively high localized concentration can therefore be obtained. In use, as the copper particle is gradually eroded in a marine environment, so the toxin coating on the particle is gradually released to provide its own antifouling effect (in addition to that of the copper), which is effective over the whole of the surface. Such further toxins are known and include, for example, tributyltin oxide and various arsenic and mercury compounds.

Generally any elastomer may be used as the elastomeric carrier material of the invention, such as natural rubber or synthetic rubber. The synthetic rubbers include, but are not limited to, polysulfonated polyethylenes, of which Hypalon is one example, ethylene propylene diene monomers, styrene butadiene rubbers, bromobutyl rubber, chlorobutyl rubber, polychloroprenes such as Neoprene and nitrile rubbers.

It has been found according to a further aspect of the present invention, that subsea markers can be made from the antifouling materials of the present invention, which markers are not only antifouling and resistant to marine corrosion but can also be made to provide excellent visibility. The ability to provide good visibility arises from the fact that the antifouling surfaces of the present invention normally comprise, in major part, an inert, water-insoluble, flexible and extensible elastomeric carrier material. Such material can be pigmented and thus colored, the coloring being substantially permanent even over prolonged periods at depth in a marine environment. A marker of such properties will be almost free of any maintenance requirement such as cleaning to remove obscuring fouling which would grow on a marker without such properties and would thus be of great benefit to underwater inspection operations using remotely operated vehicles and viewing equipment and would save considerable cost in diving operations particularly where saturation diving was involved.

Thus, according to a further aspect of the present invention, there is provided a marine identification marker for attachment to a submerged or submersible structure to provide an identification member thereon, which marker comprises a unitary support having a display surface, the display surface including an alphanumeric portion of contrasting color to that of the remainder of the display surface, and wherein either the alphanumeric portion or the remainder, or both, are formed from an antifouling material of the present invention, the carrier material of which includes a coloring pigment dispersed therein; and wherein any part of the display surface not so formed includes exposed metallic copper or copper alloy so as to prevent marine fouling on such part of the surface.

The term "alphanumeric" is used herein to signify any marking, whether by letter, number or otherwise. The transport alphabet style of lettering is preferred.

In the markers of the invention, the display surface includes a portion constituting the alphanumeric. For the avoidance of doubt, it is to be understood that the alphanumeric may comprise any number of letters, digits or other signs and while each of these may be discrete, they are collectively termed "the alphanumeric" and the total of their individual surface areas constitutes "a portion" of the display surface.

The alphanumeric portion contrasts in color with that of the remainder of the display surface in order to provide good visibility. For most purposes, black and yellow are considered to be the best contrasting colors, but other combinations of colors may of course be used (the term "color" herein includes inter alia both black and white). For reasons to be described hereinafter, markers of the invention can be made with virtually any color combination on the display surface. It will be appreciated that, while the alphanumeric portion will normally be in one uniform color, and the remainder of the display surface in another, different and contrasting, uniform color, in fact either or both may be in two or more colors as desired. For simplicity, in the following description of the invention, it is assumed that each is of one uniform color.

The facility to choose a color for either the alphanumeric portion of the display surface, or the remainder, or both, arises from the fact that each of these areas, or at least one of them, is constituted by an antifouling material of the invention in which the elastomeric carrier material has a coloring pigment (of choice) dispersed therein. Because the pigment is dispersed in the carrier material, the coloring of the markers of the invention is permanent in the sense that it will not be affected, or will be affected only very slowly, by a marine environment.

Where the antifouling materials of the present invention are in the form of self-supporting sheet materials, the markers of the invention may be formed by, for example, cutting an alphanumeric from the sheet and thereafter applying it to a support to form part of the display surface thereof.

Where, in the markers of the invention, the alphanumeric is formed from an antifouling material of the invention but the support is not, then the support will usually be copper or copper alloy sheet or an antifouling material of the type disclosed in U.S. Pat. No. 4,175,199.

In the most preferred markers of the invention, the alphanumeric portion is formed from an antifouling material of the invention of one color, and the remainder of the display surface is formed from an antifouling material of the invention of a contrasting color. In one embodiment, the support of the marker is formed from a self-supporting body of one antifouling material and an alphanumeric is fixed to the display surface of this support, the alphanumeric also being formed of an antifouling material of the invention but of contrasting color to that of the support.

Less preferred markers of the invention includes those wherein the support comprises a layer of copper or copper alloy, and an alphanumeric formed from an antifouling material of the invention is adhered to the support to provide a display surface of which the alphanumeric portion is of contrasting color to that of the copper or copper alloy constituting the remainder of the surface.

In another arrangement, the support is formed from a self-supporting body of antifouling material of the invention, and an alphanumeric of copper or copper alloy is fixed to a surface of the support, to provide a display surface constituted by a copper or copper alloy alphanumeric portion with the remainder of the surface being of such antifouling material of a contrasting color to that of the alphanumeric.

DETAILED DESCRIPTION OF THE INVENTION

Figure 3:
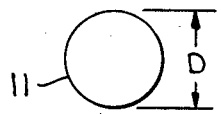
FIGS. 3 and 4 illustrate examples, at an enlarged scale, of copper or copper alloy particle shapes employed in the invention.
Figure 4:
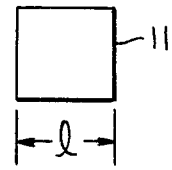

Turning now to the drawings wherein like reference characters refer to like and corresponding parts throughout the several views, the marine antifouling material of the invention comprises a layer 10 of inert, water-insoluble, flexible and expansible elastomeric material. Layer 10 has embedded therein a plurality of copper or copper alloy particles 11 of essentially uniform shape and uniform size. The particles are solid and may be formed by cutting or chopping circular or square-section wire such that the shape of all the particles are such that the ratios of the major dimensions thereof are all in the range of about 0.7 to 1.0. For example, when cut from a wire of circular cross-section, the particles have a diameter D equal to the length 1 thereof as illustrated in FIGS. 3 and 4. Otherwise, depending on the cross-sectional shape of the wire from which the particles are formed, they may each comprise a body having a rounded surface, such as elliptical. Or, the particles may be formed of any polyhedral shape, such as a cube. Irrespective of shape, the major dimensions such as D and 1 of each of the particles are all in the range of about 0.7 to 1.0, preferably 0.8 to 1.0, i.e. essentially of uniform size and shape.

According to the invention, it is important that the particles be formed as a single layer having a depth d equal to the major dimensions D and 1 of each particle. In accordance with one procedure which can be used in forming a monolayer of copper particles, the particles may be simply loaded onto a sheet having a sticky or tacky surface such as that formed by a layer of adhesive. In accordance with standard practice for bonding metals to rubbers, the copper particles will have been sprayed with a conventional bonding agent, such as Chemlok, to improve their bonding to the rubber. The particles are spread on the tacky surface to form the single layer such that the surface spacing between particles is about 0.5 to 0.75 mm, i.e. the furthest distance from the nearest exposed copper is no greater than about 0.75 mm, and not less than about 0.5 mm. This surface spacing can be controlled by loading a predetermined quantity of particles onto the surface. The intended spacing is then automatically effected as a monolayer. The sticky sheet may then be placed in a mold with a sheet at the bottom and particles extending into the mold. The mold depth is greater than the size D and 1 of the particles and is filled with uncured elastomer so as to fill the interstices between adjacent particles and forming an elastomeric layer 10 having a thickness t. The elastomer is then cured, removed from the mold and the sticky sheet is simply pulled off thereby forming a layer 10 of marine antifouling material having a layer of copper or copper alloy particles 11 forming a monolayer exposed at an outer surface 12 of the material to provide a mulitiplicity of generally evenly sized discrete copper areas in the inert material continuum outer surface 12. The particles of copper alloy consist typically of cupro-nickel which securely bonds to the elastomer. This is a known property of cupro-nickel having nothing to do with the invention.

The layer of antifouling material thus formed will require no or very little abrasion of outer surface 12 to expose the copper which is already exposed with the particulate copper embedded in the inert material.

The minimum desirable area of exposure of metal at surface 12 is of at least 20% and the maximum necessary area is 40%, relative to the total area of surface 12, to provide the desired antifouling. And, because the particles are embedded in elastomeric layer 10 at surface 12 thereof, there is an insulating layer formed below the particles which is laid in contact with or joined at its undersurface 13 to a surface to be protected such as metallic pipe 14 of FIG. 5, or a metallic wall 15 of FIG. 7. This insulation ensures that the copper particles do not contact the metallic substrate (steel for example), since if so contact between the particles 11 and the steel substrate would promote corrosion. Also, if by chance any copper particle should contact the steel substrate, this would not "short-out" all the copper for antifouling purposes since each copper particle is insulated from adjacent particles. Were it not for this insulation between adjacent particles, then the whole of the exposed copper would be rendered useless for antifouling purposes if one part of the copper contacted the baser metal.

The layer 10 having a monolayer of embedded copper or copper alloy particles therein at surface 12 effects substantially permanent (between 30 and 50 years) antifouling at minimum cost in terms of copper usage and copper loss by leaching. Copper exposure of more than 40% can be used but is not necessary and, in use of the material for antifouling purposes, is wasteful of copper which is of course gradually leached away in a marine environment. And, the uniform size of the particles is important in respect of the useful life of the product. By having particles of a uniform size, they will all become depleted at approximately the same time whereas, if particles were to be used which were not of uniform size, then some would be leached away well before others, thus forming a surface with inadequate copper for antifouling purposes.

Figure 6:
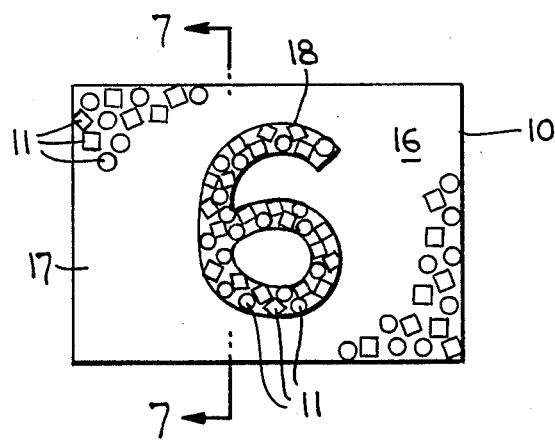
FIG. 6 is a plan view of a display surface of a flat marker produced according to the invention.

In addition, the low copper exposure of between approximately 20 and 40% of the total area of the outer surface 12 of the elastomeric layer enables more of the inert material to be seen when used as a marine identification marker which, if it is colored, enables contrasting color markers to be made. The markers shown in FIGS. 6 and 7 comprises a display surface 16, being one face of a support panel 17, and having an alphanumeric 18 (the numeral "6") thereon. Support 17 may be made of an antifouling material of the invention and may be colored yellow. Alphanumeric 18 may be cut from a black antifouling material of the invention and mechanically fixed, or bonded for example by adhesive, to the support surface. Otherwise, alphanumeric 18 or support panel 17 may be of antifouling material according to U.S. Pat. No. 4,375,199, for example, while the other of 17 and 18 may be of antifouling material according to the invention.

Figure 1:
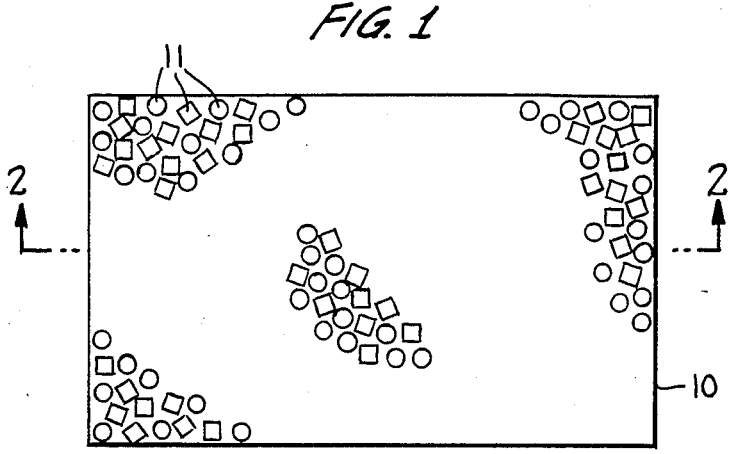
FIG. 1 is a plan view of the marine antifouling material according to the invention.
Figure 5:
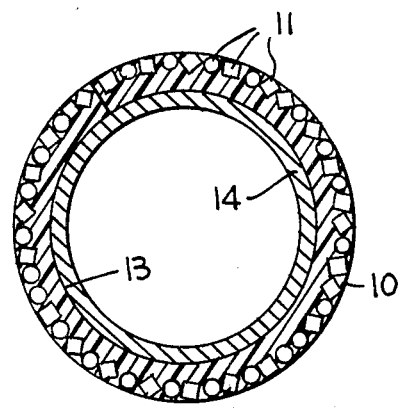
FIG. 5 is a cross-sectional view of the material of FIG. 1 secured around a metal pipe.
Figure 2:
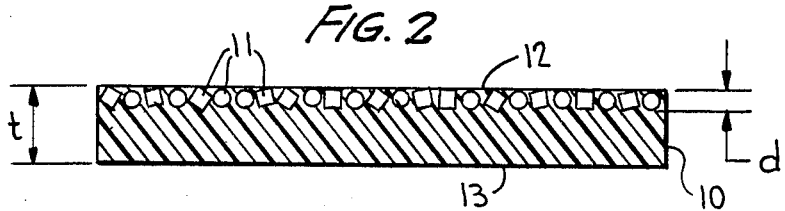
FIG. 2 is a sectional view taken substantially along the line 2—2 of FIG. 1.
Figure 7:
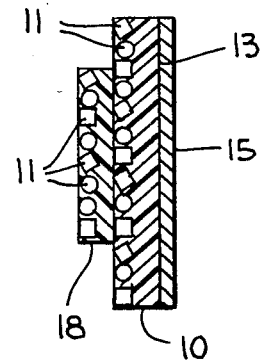
FIG. 7 is a cross-sectional view taken substantially along the line 7—7 of FIG. 6.

Although only a tubular structure 14 such as a pipe is shown in FIG. 5 to which the carrier material of the invention is secured, and only a flat wall 15 is shown in FIG. 7 as a base to which the carrier material is secured, base materials to be protected having any and all shapes can be effectively covered by the marine antifouling material of the invention. For example, because of the flexibility and extensibility of the elastomeric carrier material employed for the invention, the copper embedded elastomer may be fixed to a support surface having a small or large radius of curvature, or tailored to form a compound curve, or pipe juncture, etc.

Obviously, many other modifications and variations of the invention are made possible in the light of the above teachings.

It is therefore to be understood that within the scope of the appended claims the invention may be practiced otherwise than as specifically described.

What is claimed is:

1. A marine antifouling material for providing an antifouling surface for use in sea water, comprising a layer of inert, water-insoluble, flexible and extensible elastomeric carrier material having an outer surface and an opposed inner surface and having embedded therein a single layer only of a plurality of copper or copper alloy particles, all of said particles being essentially of the same size in the range of 0.5 to 3.0 mm, the ratios of the major dimensions of said particles all being in the range of about 0.7 to 1.0, and said single layer having a maximum thickness equal to the size of said particles, all of said particles being exposed at said outer surface of said carrier material to provide a multiplicity of generally evenly sized discrete copper areas in the inert material continuum outer surface, said areas being spaced by 0.5 to 0.75 mm, the total area of the spaced copper areas being between 20 and 40% of the total area of the antifouling surface of said antifouling material, said layer of particles being spaced from the opposed inner surface of said carrier material whereby said inner surface has no copper exposed thereat, and wherein said antifouling surface of said antifouling material is accessible to sea water and the multiplicity of spaced copper areas thereon retard or prevent marine growth on said antifouling surface.

2. The material according to claim 1, wherein said particle size is about 1.5 mm.

3. The material according to claim 1, which further contains, in addition to said particles, another toxin against marine fouling organisms.

4. The material according to claim 3, wherein said another toxin is present as a coating on said particles.

5. The material according to claim 1, wherein said elastomeric carrier material comprises natural rubber.

6. The material according to claim 1, wherein said elastomeric carrier material comprises synthetic rubber.

7. The material according to claim 1, wherein each of said particles comprises a polyhedron.

8. The material according to claim 7, wherein each of said particles comprises a cube.

9. The material according to claim 1, wherein each of said particles comprises a body having a rounded surface.

10. The material according to claim 9, wherein each of said particles comprises a cylinder.

11. The material according to claim 1, wherein said particles comprise a mix of polyhedral bodies and bodies having rounded surfaces.

12. A marine identification marker for attachment to a submerged or submersible structure to provide an identification member thereon, said marker comprising a unitary support having a display surface, the display surface including an alphanumeric portion of contrasting color to that of the remainder of said display surface, and wherein either said alphanumeric portion or said remainder, or both are formed from an antifouling material comprising a layer of inert, water-insoluble, flexible and extensible elastomeric carrier material having first and second opposed surfaces and, embedded in said material, a single layer only of a plurality of copper or copper alloy particles, all of said particles being of essentially the same size in the range of 0.5 to 3.0 mm, the ratios of the major dimensions thereof all being the range of about 0.7 to 1.0, and said single layer having a maximum thickness equal to the size of said particles, all of said particles being exposed at said first surface of said carrier material to provide a multiplicity of generally evenly sized discrete copper areas in the inert material continuum surface, said areas being spaced by 0.5 to 0.75 mm, the total area of the spaced metal areas being between 20 and 40% of the total area of said first surface, said layer of particles being spaced from said second surface of said material whereby said second surface has no metal exposed thereat, said carrier material including a coloring pigment dispersed therein, and wherein said second surface of said material is attachable to said structure whereby said first surface of said material is accessible to sea water and the multiplicity of spaced metal areas thereon retard or prevent marine growth on said first surface.

13. The marker according to claim 12, where said particle size is about 1.5 mm.

14. The marker according to claim 12, which further contains, in addition to said particles, another toxin against marine fouling organisms.

15. The marker according to claim 14, wherein said another toxin is present as a coating on said particles.

16. The marker according to claim 12, wherein said elastomeric carrier material comprises natural rubber.

17. The marker according to claim 12, wherein said elastomeric carrier material comprises synthetic rubber.

18. The marker according to claim 12, wherein each of said particles comprises a polyhedron.

19. The marker according to claim 18, wherein each of said particles comprises a cube.

20. The marker according to claim 12, wherein each of said particles comprises a body having a rounded surface.

21. The marker according to claim 20, wherein each of said particles comprises a cylinder.

22. The marker according to claim 12, wherein said particles comprise a mix of polyhedral bodies and bodies having rounded surfaces.

* * * * *